J. W. TROEGER.
METHOD OF AND APPARATUS FOR FORMING ROOFING SHINGLES.
APPLICATION FILED SEPT. 3, 1909.
1,014,424.
Patented Jan. 9, 1912.
3 SHEETS—SHEET 3.
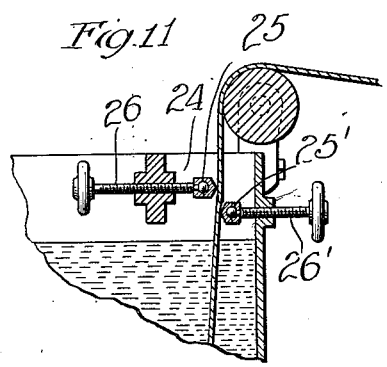
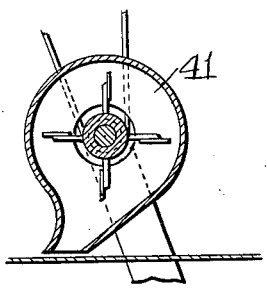
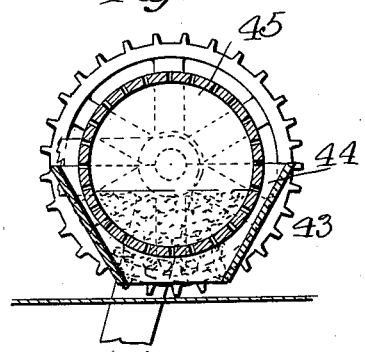
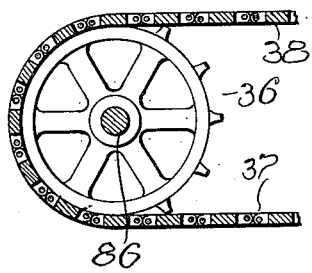
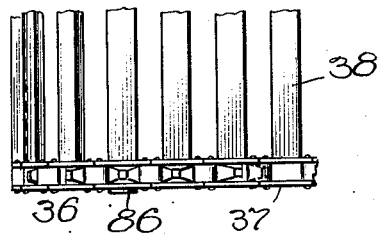

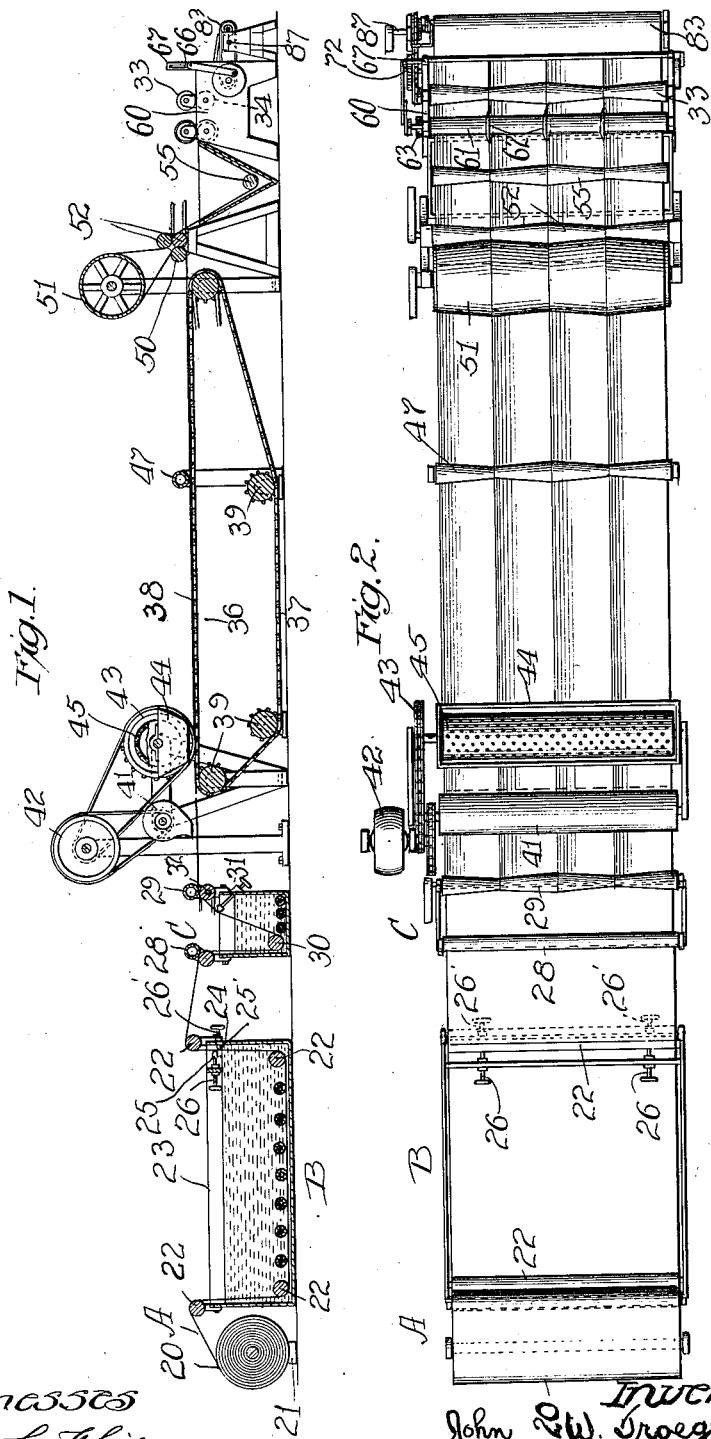

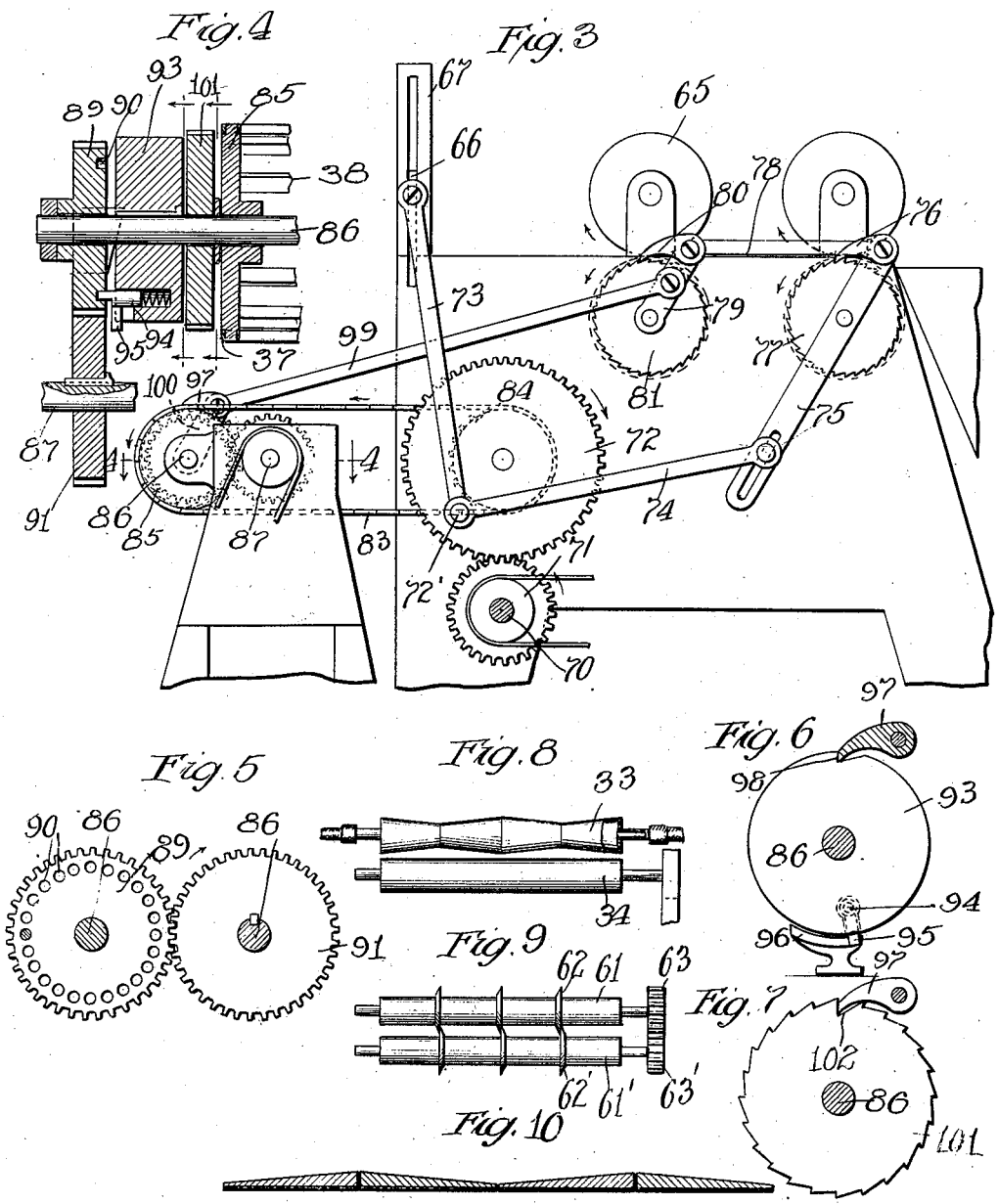

UNITED STATES PATENT OFFICE.

JOHN W. TROEGER, OF LA GRANGE, ILLINOIS.

METHOD OF AND APPARATUS FOR FORMING ROOFING-SHINGLES.

1,014,424.　　　　　Specification of Letters Patent.　　Patented Jan. 9, 1912.

Application filed September 3, 1909. Serial No. 516,074.

*To all whom it may concern:*

Be it known that I, JOHN W. TROEGER, a citizen of the United States, residing at La Grange, in the county of Cook and State of Illinois, have invented certain new and useful Improvements in Methods of and Apparatus for Forming Roofing-Shingles, of which the following is a specification.

My invention relates to improvements in method of and apparatus for forming roofing shingles, and has for its general object to provide a process and apparatus whereby tapered felt-roofing shingles,—that is to say, roofing-shingles having a felt-like base and a tapered body of plastic waterproof material,—may be formed uniformly, quickly, and easily, and with minimum cost.

In the practice of my invention, I take as a base a long sheet of porous, fibrous, flexible material, generally designated as felt, such for instance as the felt paper commonly employed in the manufacture of roofing material, said sheet being preferably of a width as great as the length of a plurality of shingles to be formed, applying upon said base in transit a coating of waterproofing material in a relatively thick layer; shape said superposed layer of plastic material so that the cross section of the sheet simulates the longitudinal section of a plurality of shingles finally to be formed; appropriately treat the composite structure thus produced to secure desired surface qualities, hardness, etc.; and then cut the formed sheet lengthwise and transversely to sever, and thereby to complete the formation of, individual shingles.

My invention in its practice may best be understood from the following description taken in conjunction with the accompanying drawings, wherein I illustrate the practice of my invention in one apparatus suitable for the purpose, and wherein—

Figure 1 is a schematic view, partly in section and partly in elevation, of a system employed in the practice of the invention; Fig. 2 is a plan view thereof; Fig. 3 is an enlarged exterior view of a cutting mechanism therefor; Figs. 4, 5, 6, and 7 are enlarged details of parts of the cutting and coating mechanism; Fig. 8 is a detail of forming rolls; Fig. 9 is a detail of the cutting rolls; Fig. 10 is an enlarged cross sectional detail of a formed and cut sheet; Fig. 11 is a detail of a "doctor" or stripping mechanism associated with the dipping tank; Fig. 12 is a detail of a cooling fan; Fig. 13 is a detail of material feed mechanism; and Figs. 14 and 15 are details of a conveyer.

In the practice of my invention, a felt-paper sheet, A, supplied initially in the form of a roll, 20, is fed from a suitable roll support, 21, over guiding rollers, 22, at the top and bottom of a tank, 23, so as to pass down into and through the tank for immersion in a fluid body, B, therein. The tank contains a solution which is thoroughly waterproof, which is capable, when fluid, of thoroughly permeating the porous web or sheet, A, and which has a melting point sufficiently high to resist the accumulative heat of the sun upon the roof—say a melting point approximating 300° F.,—and the solution is maintained fluid in the tank by constant application of heat thereto, as through the agency of superheated coils within the tank. Such a saturating or waterproofing solution, I find effectively to be provided by a composition of 8 parts asphalt with a melting point of 260° F., two parts of asphalt with a melting point of 140° F., two parts of wax tailings, and one part of rosin, all heated to such a degree that it will penetrate the porous felt sheet A, or to say about 350° F. In passing from the tank, the dipped web passes under the influence of a "doctor" or stripping mechanism, 24, which relieves it of superfluous material, such structure preferably consisting of a pair of opposed scraper heads, 25 and 25', separated slightly in a vertical plane, and mounted for relative movement upon screws, 26 and 26', in suitable fixed supports, so that their tension against the passing primarily coated web may be adjusted. From the tank, B, the web in a saturated condition passes on to receive upon one surface thereof a thicker secondary or body coat of plastic material, and to this end, in the embodiment shown, passes between guide rollers, 28, into a tank, 29, containing a body, C, of suitable melted plastic material. This secondary coating material is a solution having a still higher melting point than the fluid body B, and such solution I find is best supplied to the sheet at a temperature sufficiently close to its melting point to adhere thereto thickly. When cool the coating should be of a waterproof character having its stability practically unaffected by ordinary sun heat. Such a solution, I find, may well be provided by the employment of 6 parts of asphalt having a melting point of 300° F., 5 parts of asphalt having a melting point of 260° F., one part of asphalt with a melting point of 140° F., and 2 or three parts of powdered mineral, such for example as slate (which I preferably employ), actinolite, powdered asbestos, or the like, shred asphalt, or any other weather resisting mineral, preferably having a tendency to reduce the "sliding" quality of the compound.

It will be understood that the particular compounds above referred to are given only for purposes of full disclosure of my best present practice of the invention and without intent to indicate that the invention is limited to the employment of the materials, quantities, or melting points specified, as I have found in experience that wide variation may be made in the precise materials, etc., employed without departure from the spirit and scope of the invention, although preferably I employ in the initial coating of the material a waterproofing compound which will thoroughly permeate the base web, resist the action of sun heat, and combine well with the superposed secondary coat, and compound the secondary coat of ingredients giving it a still higher melting point, considerable flexibility when cooled, impermeability to moisture, and relatively stable or "non-sliding" qualities under sun heat.

In the specific construction shown in the drawings the web passes in the tank C over a bottom roller 30 and up over a "doctor" or stripper, 31, which takes from its under side substantially all of the material of the secondary coating deposited on such side of the sheet, so that the web passes to the top of the tank with only a relatively thick coating upon its upper surface.

In lieu of dipping the web in the compound for forming the secondary coating and scraping the material from the under side of the web, the web may be run flat across the open mouth of the receptacle, 29, and the compound poured on its upper surface only, from above, the operation to be performed consisting merely in the application of a relatively thick body of a plastic material upon the upper surface of the web. On leaving the secondary coater, 29, the web passes under the influence of a former, 32, by the operation of which the heavy coat of plastic compound is shaped to a configuration which, transversely of the web, conforms to the longitudinal section of one or more shingles set end to end. Specifically, I prefer that the shaping shall be done by a pair of rolls, 33 and 34, the lower roll 34 being cylindrical and driven and the upper roll, 33, being idle and providing a series of tapering or conoidal zones, each equal in length to the length of a shingle to be formed, said zones being arranged in end-abutting relation with ends of like thickness together, as best shown in Fig. 8. In the specific construction shown, the rolls are of such formation as to mold four shingles to the sheet, forming two ridges in the plastic material, which, when the sheet is cut, become the butts of the shingles. It is preferable that the web-supporting members of the molding mechanism be a driven roller, but the upper former for the plastic material may, with good results, be a stationary member having only its lower edge shaped to form the passing plastic body upon the web into the desired contour. The upper member, however, shown as the roller 33, should be hollow and heated, as by steam, or otherwise, so that the material will not stick thereto, and it should operate upon the material while the latter is still hot enough to be adequately plastic.

From the former 32 the web passes on to a suitably driven conveyer, 36, preferably consisting of a pair of driven chains, 37 and intermediate slats, 38, the chains being supported and driven by suitable sprockets, 39, one or more of which may be driven from any suitable source of power, not shown. During the early portion of the course of the web from the former 32, it is preferably air-cooled to a suitable extent to retain its impressed form by a blast of air directed thereto from a fan 41, suitably driven, as by a motor, 42, and the plastic coating has dusted thereon a finishing coat of suitable material, for giving the shingles any desired superficial appearance and to relieve them of stickiness. To this end I preferably use a powder of mica or soap-stone supplied from a dredge, 43, consisting of a hopper, 44, and a rotating perforated drum, 45, therein, suitably filled with the powdered material and driven, as by the motor 42, evenly to shake the material down from the hopper. If desired, the powdered material thus applied may be forced intimately into contact with the body compound by a roller, 47, which may be steam-heated;—but this is not essential. After receiving its finishing coat, the web needs sufficiently to be cooled for cutting, and then to be cut into appropriate shape for the completion of the shingles; and so, if the conveyer is made long enough, the web may be run therefrom direct to the cutting knives. I prefer, however, to run the web back over itself for a suitable distance to shed off all loose particles of the finishing coat, and to this end I run the web under a guiding roller, 50, over a suitably supported rotatable drum, 51, set back of and above the roll 50, and then through a pair of pinch rolls, 52, suitably driven to give the web a steady forward progression, and shaped to accommodate the formed material. Up to the rolls, 52, the progress of the sheet is steady and uniform, but its movement with respect to the cutting mechanism is intermittent, and, therefore, between the pinch roll, 52, and the cutting mechanism a space is provided in which the web may have some slack, the specific construction shown providing a slack-take-up roll, 55, interposed between the pinch roll and the cutting mechanism, generally indicated at 60.

The cutting mechanism may be of various forms suitable to split the web lengthwise to divide the web into longitudinal strips each of a cross section corresponding to the longitudinal section of a shingle, and transverse cutting mechanism for severing the strips transversely at intervals into shingles of appropriate width. In the construction shown, the slitting means comprise a pair of companion rollers, 61 and 61', provided with coacting circular knives, arranged on the line of juncture of the different tapered zones of the web and rotated in unison but in opposite directions by intermeshing gears, 63 and 63', thereon. In front of the cutters, 61 and 61', are a pair of pinch rolls, 64, connected to be driven synchronously with the cutter, so as properly to draw the web through the cutter; and in advance of the pinch rolls is a vertically reciprocating knife, 66, mounted in suitable guides, 67, to effect the transverse cutting. These parts are connected for coöperation to be driven from a common power shaft, 70, having mounted thereon a pinion, 71, meshing with the gear, 72, which has companion pitmen, 73 and 74, the former connected with the knife, 66, to reciprocate it vertically and the latter extending substantially horizontally through a slot connection with the lever, 75, pivoted loosely on the shaft of the cutter 61' and bearing a pawl, 76, coöperating with ratchet 77, mounted fast on the said cutter shaft. The pawl-end of the lever, 75, has a fixed connection, 78, with the crank arm, 79, loosely mounted upon the shaft of the lower pinch roll 65 and said arm 79 bears a pawl 80 coöperating with a ratchet, 81, fixed to the shaft of said roll, so that obviously during the rotation of the gear 72, in the direction indicated by the arrow, movement of the wrist pin, 72', simultaneously raises the knife 66 and advances the pawls 76 and 80 to operate the cutting and pinch rolls, while the knife completes its effective descent on the reverse or retracting movement of the pawls, so that the web is at rest during the time that the transverse cut is made and in motion during the time that the knife is elevated.

In connection with the cutting mechanism described, I conveniently provide means for delivering the cut shingles in enumerated stacks, and to this end I provide a chain belt, 83, running over two idle sprocket pulleys, 84 and 85, the latter being mounted fast on the shaft, 86, bearing mechanism for intimately connecting it with a constantly rotated shaft, 87. Specifically, the shaft 86 has loosely mounted thereon a pinion, 89, provided with a series of openings 90 and meshing with the gear, 91, on the constantly rotating shaft 87. Said shaft 86 also carries, fixed thereto, a head 93, bearing a latch member, 94, spring-pressed toward the pinion 89 to engage, when permitted to do so, any one of the apertures 90, thereby to effect connection for rotation between the normally idle pinion 89 and the shaft 86. The latch, 94, however, has a projecting finger, 95, which normally stands at the top of a stationary cam incline 96, and which, when in this position, throws the latch to releasing position out of engagement with the pinion 89. The head 93 may be rotarily moved to disengage the finger 95 from its cam incline 96, to permit the latch to effect operative engagement with the pinion 89 by the engagement of the pawl 97 in the peripheral notch, 98, in the periphery of the head, said pawl being arranged to vibrate coincidentally with the cutter operating pawl through the agency of a link connection 99 between the pawl bearing lever 100 and the lever 79. The pawl 97, however, is permitted to engage the notch 98 only at intervals of a given number of reciprocations, and to this end a loose ratchet 101 is provided upon the shaft, having a determined number of teeth projecting wholly above the periphery of the head 93, and one deep notch 102 extending into the depths of the notch 98 in the periphery of the head 93. Accordingly, it will be seen that,—asuming the disk 93 and ratchet 101 to stand with notches 102 and 98 in registry and engaged by pawl 97, as best shown in Figs. 6 and 7, with the latch arm 95 standing at the top of its incline 96,—advancement of the pawl 97 throws the arm 95 of the latch off of its incline or cam so that the latch member 94 falls in one of the holes, 90, in the constantly, but normally idly, rotating pinion 89. This latching operation locks the normally idle pinion 89 fast upon the shaft 86 so that the motion transmitted from the constantly operated power shaft 87, through the shaft 86, rotates the head 93 until the finger 95 of the latch 94 rises up on the cam 96 and pulls the latch out of engagement with the normally idle pinion 89. This complete rotation brings the latch back to operative relation to the pawl 97 but the ratchet 101 having moved forward one step, the pawl 97 disengages the deep notch 102, and during the determined number of its reciprocations thereafter is elevated by the teeth of the ratchet out of operative relation to the notch 98, so that a definite number of reciprocations of the ratchet occur before the conveyer again moves forward. During each such reciprocation of the ratchet 97, a cutting operation of the knife 66 takes place so that between the feeding operations of the belt, known numbers of shingles are cut and dropped to the belt. In this way I automatically count the shingles so that when delivered forward to the end of the belt they may be tied in bundles in definitely determined numbers.

While I have herein described in some detail the practice of my invention and its embodiment in a particular machine, it will be apparent to those skilled in the art, that variations might be made in the apparatus and practice of my invention without departure from its spirit and scope and within the scope of the appended claims.

What I claim is:

1. The art of making composition shingles which consists in emplacing upon a traveling base web a plastic body, forming said body to present longitudinally continuous elevations and depressions constituting transversely tapering areas, and cutting said web and body at the junctures of said tapering areas and transversely at intervals to produce tapering shingles.

2. The art of making a shingle which consists in superposing upon a base of substantially uniform thickness, a plastic body, forming said body to present longitudinally continuous elevations and depressions constituting transversely tapering areas, and cutting said web and body transversely longitudinally and from which to produce composition tapering shingles.

3. The art of manufacturing composition shingles which consists in depositing upon a traveling web a coating of plastic material, forming said material in transit to present a plurality of longitudinally continuous elevations and depressions comprising transversely tapering areas, cutting said coated product lengthwise at the juncture of said tapering areas, and crosswise at proper intervals to produce tapered composition shingles.

4. The art of manufacturing roof shingles which consists in coating a moving elongated web of base material with a plastic melted coating of varying thickness to present in cross section a plurality of longitudinally continuous tapered zones, and cutting said web lengthwise between the zones and crosswise at intervals to produce relatively long, narrow, longitudinally tapering shingles.

5. The art of making composition shingles which consists in continuously applying to a moving web of porous base material an impregnating coating of waterproofing compound, applying to a surface of said web a permanent coating of waterproofing material, molding said plastic material to present in cross section a plurality of longitudinally continuous tapered zones, and cutting said web longitudinally and transversely to divide the web into longitudinally tapered shingles.

6. The art of manufacturing roofing material which consists in molding the plastic coating of a moving web after application thereto to form a longitudinally extending, uniformly continuous elevation and depression constituting a transversely tapering coat, and cutting the web transversely and subsequently longitudinally to form tapered shingles.

7. In a machine for making concrete shingles, web guiding and driving means, web-coating means, coat forming means arranged for forming the web coating into transversely tapering and longitudinally extending, uniformly continuous thickness while in transit, means for cutting the web longitudinally at the junction of said tapering surfaces, and means for cutting the web transversely at intervals to form shingles.

8. In a machine for making concrete shingles, web guiding and driving means, web coating means, coat forming means arranged for forming the web coating to tapering thickness in cross section, web cutting means for severing the web into longitudinally tapered shingles, and shingle receiving and counting means.

9. In a machine for making composition shingles, a web guiding means, web driving means, a web impregnating tank, web coating means for applying plastic material to the web surface, forming means for molding said applied coating into a succession of longitudinally continuous and transversely tapered areas, and means for cutting said web longitudinally and transversely into independent longitudinally tapering shingles.

10. In a machine for making cement shingles, means for impregnating and coating a web, and means, providing a part mounted above the web for reducing the thickness thereof to a uniformly continuous longitudinal zone to present a cross section of gradually tapering thickness transversely thereof, and cutting means for longitudinally cutting the web at the junction of said tapering surfaces and means for cutting said web transversely at intervals to form shingles.

11. In a machine for making roofing material, means for applying a coating to a web, means for molding said coating into longitudinally continuous transversely tapering thickness, means for constantly passing a web through said coating and molding means, means for intermittently cutting said web into shingles, and means for intermittently pasing the web through the cutting means.

In testimony whereof I hereunto set my hand in the presence of two witnesses.

JOHN W. TROEGER.

In the presence of—
  W. LINN ALLEN,
  MARY F. ALLEN.